July 4, 1939.  W. R. SEYFRIED  2,164,627
PROCESS FOR TREATMENT OF PHOSPHATIC SOLUTIONS
Filed July 17, 1937
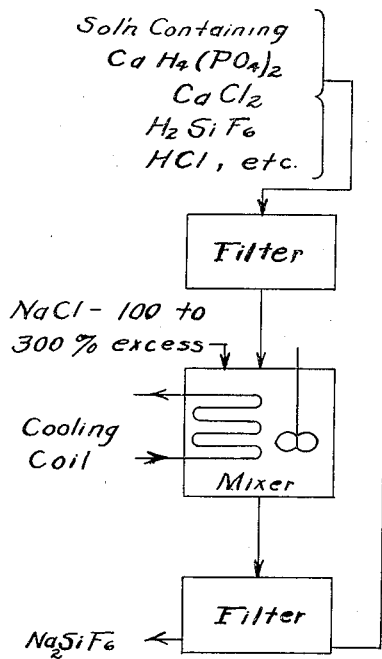
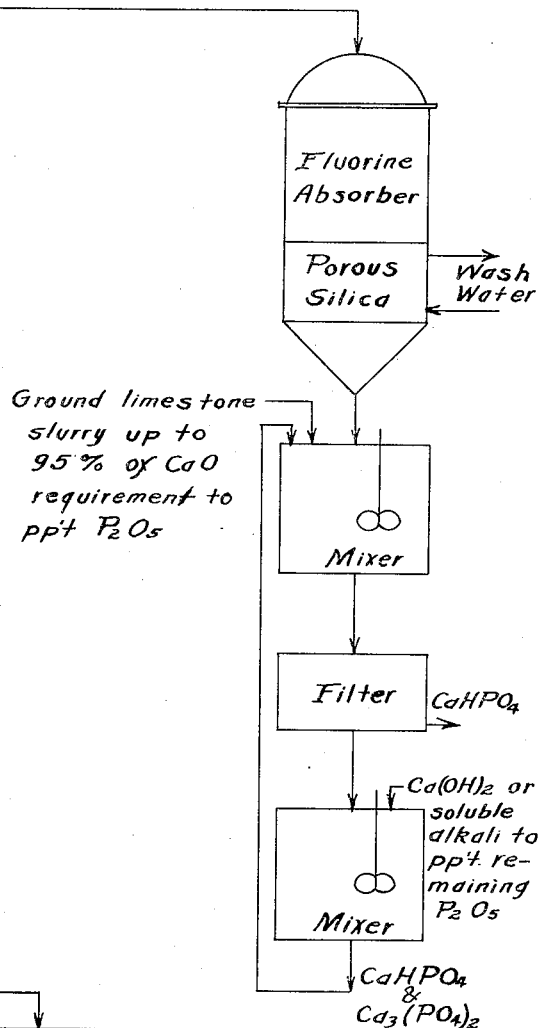
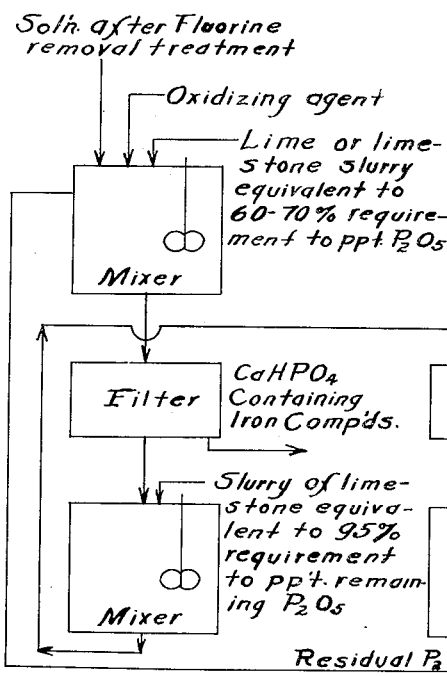
Inventors
Warren R. Seyfried
BY Johnston & Jennings Attorneys Patented July 4, 1939

2,164,627

UNITED STATES PATENT OFFICE 2,164,627

PROCESS FOR TREATMENT OF PHOSPHATIC SOLUTIONS

Warren R. Seyfried, Tampa, Fla.

Application July 17, 1937, Serial No. 154,260

6 Claims. (Cl. 23—109)

This invention relates to the treatment of phosphatic solutions, particularly solutions obtained when phosphate rock is digested with hydrochloric acid, as disclosed in prior patents of Warren R. Seyfried Nos. 1,969,951 and 2,061,639.

The principal objects of this invention are to provide for greater, more economical recovery of the $P_2O_5$ content of the solution as citrate soluble phosphate; an improved recovery of the fluorine content of the rock as a marketable product; and the production of phosphate of lower fluorine content than has heretofore been considered economically practical.

In the prior patents aforesaid, there is described and claimed processes in which the phosphate rock is leached with a solution of hydrochloric acid resulting in a solution containing calcium chloride, iron and aluminum chloride, monocalcium phosphate, and some free hydrochloric acid, besides practically all of the fluorine content of the rock in soluble form in the solution, predominantly as hydrofluosilicic acid.

I have found it to be advisable to recover the phosphate values from such solutions in the form of dicalcium phosphate which precipitates out of the solution, but which is citrate soluble, making it an ideal fertilizer product. But unless the fluorine content of the solution is previously removed this will be precipitated with the dicalcium phosphate upon addition of the precipitating agent. Not only is this fluorine an undesirable constituent having little or no fertilizer value, and which may even exert a toxic effect, but it has a very pronounced inhibiting influence on the citrate solubility of the resulting product. It is accordingly highly important that the fluorine content of the solution be removed before the precipitation of the dicalcium phosphate therefrom.

By adopting the procedure herein outlined, I remove the major portion of the fluorine directly from the solution as marketable sodium fluosilicate, then reduce the remainder to a negligible amount by the action of porous silica thereon, after which I produce a practically fluorine free dicalcium phosphate. As is well known, the bulk of the fluorine compounds may be removed from the solution in the form of marketable sodium fluosilicate by the addition of sodium chloride. This treatment, however, removes only from 70% to 80% of the fluorine, even when 100% to 300% excess of the theoretical amount of sodium chloride required, is employed, because of the solubility of the sodium fluosilicate in the liquid medium.

I have discovered that the remaining fluorine may be removed by bringing the solution into intimate contact with a mass of porous silica, such, for example, as that made by leaching serpentine or chrysocolla, or like sand, with strong mineral acids, or with silica gel. I have succeeded in removing substantially all of the fluorine from a solution by allowing it to pass by gravity through a bed of such porous silica six feet in depth, at the rate of 1½ gallons per minute per square foot of area of the bed. When the silica skeleton or silica gel has been used until it becomes inactive, it can again be activated by simply running a reverse flow of water through it, which removes the fluorine in the skeleton in the form of a solution which, as more particularly described hereafter, may be recovered if desired.

I have further discovered that about 95% of the $P_2O_5$ content of the solution can be recovered in the form of dicalcium phosphate by reacting with ground limestone, with practically no formation of insoluble tricalcium phosphate. The reaction between the limestone and the monocalcium phosphate solution goes on readily at room temperature, without the addition of heat, which is surprising in that, as is well known, it is endothermic in nature, consuming about 3500 heat units per mole equivalents. The remaining 5% of the $P_2O_5$ content of the solution may be recovered, after filtering, as dicalcium phosphate, but with a larger percentage of insoluble tricalcium phosphate by mixing with a more active reagent, such as milk of lime or any of the soluble alkalies, such as sodium or potassium hydroxide, sodium or potassium carbonate, or ammonium hydroxide.

In the accompanying drawing,

Fig. 1 is a flow sheet showing the removal of fluorine compounds and the recovery of fluorine free dicalcium phosphate from a solution obtained by digesting phosphate rock with hydrochloric acid; and Fig. 2 is a flow sheet showing the procedure to be followed where it is desired to remove all of the iron and organic matter from the solution before the precipitation of the dicalcium phosphate for food grade purposes.

Referring first to Fig. 1, the hydrochloric acid solution of phosphate rock is first filtered and is then passed to a suitable mixing vessel where sodium chloride in an amount usually ranging from 100% to 300% over that theoretically required to react with the hydrofluosilicic acid in the solution, is added with strong agitation and with cooling to precipitate the fluorine compounds as sodium fluosilicate. The pH of the solution before this treatment is around 2.0 to 2.5, which I have found is the most favorable for maximum precipitation under the conditions of my process.

After the reaction has gone as far as it will, the sodium fluosilicate is filtered off and the solution is passed through a bed containing a silica skeleton, as before described, where substantially all of the remaining fluorine is removed. The fluorine absorbed by the silica skeleton may be recovered by passing wash water through the skeleton and returning the wash water to the process, preferably substituting it for fresh water supplied to the extraction tower. It is understood also that arsenic compounds may be removed at any desired point in the process by the usual method of adding hydrogen sulphide or sodium sulphide thereto.

After the sodium fluosilicate has been removed from the solution, I preferably add ground limestone thereto, with agitation, in the form of a water slurry, preferably containing four to six pounds limestone per gallon of slurry, until about 95% of the theoretical CaO requirement to react with the $P_2O_5$ content of the solution to make dicalcium phosphate has been added. The limestone reacts with the monocalcium phosphate in the solution to form dicalcium phosphate with the evolution of $CO_2$. I have found that by thus treating the solution, I can form dicalcium phosphate with practically no formation of insoluble tricalcium phosphate such as is inevitably formed when milk of lime is added, even when the latter is added slowly with the greatest of precaution and with maximum agitation. With milk of lime addition, the minimum tricalcium phosphate formation which I have been able to obtain under strictly controlled conditions has been around 2% of the total $P_2O_5$ involved, whereas when utilizing ground limestone the amount formed is only a small fraction of 1% of the $P_2O_5$ involved. I have also experimented in the laboratory with pure calcium carbonate in the form of precipitated $CaCO_3$, as a reagent, and have found that, under most carefully controlled conditions, there is a minimum of more than 1% of the $P_2O_5$ involved which is precipitated as insoluble tricalcium phosphate. It is apparent, therefore, that there is a considerable economic advantage in the use of ground limestone in this step of my process because of the relative sluggishness of the reaction and because dicalcium phosphate and limestone will not react further, whereas milk of lime and precipitated calcium carbonate will continue to react beyond the dicalcium stage, under the conditions under which I carry on my process.

Thus, where more than 95% of the theoretical requirement of CaO is added in the form of limestone slurry, it does not react further with the dicalcium phosphate, or revert to insoluble tricalcium phosphate, but remains with the dicalcium phosphate as an excess. It is thus not an objectionable addition to the dicalcium phosphate when the latter is employed as a fertilizer.

Instead of adding the limestone to the solution in the form of a slurry, I may wet grind the limestone directly, utilizing the solution to be reacted upon as the medium in which the limestone is ground. By this procedure I avoid the addition of more water to the solution and save one step in the process. There is also the advantage that there is thorough agitation and mixing in the grinding apparatus as the reaction proceeds.

The dicalcium phosphate recovered as above described is now filtered and washed to remove the calcium chloride and dried, whereupon it is ready for marketing. The remaining $P_2O_5$ in the solution may be precipitated in the form of a mixture of di- and tricalcium phosphate by the addition of a stronger alkaline reagent, such as milk of lime, or any of the soluble alkalies. This mixture is returned to the monocalcium phosphate solution where it is dissolved and the $P_2O_5$ recovered as dicalcium phosphate.

Referring to Fig. 2 of the drawing, I show the procedure which I preferably follow when a purer dicalcium phosphate is desired; that is, one that is free of iron and organic compounds. After the monocalcium phosphate-calcium chloride solution has been passed through the bed of silica skeleton to remove the fluorine, I next treat the solution with an oxidizing agent, such as calcium hyprochlorite or bleaching powder. Also, gaseous or liquid chlorine can be added to the solution with agitation. This oxidizes the ferrous iron in the solution, (which may comprise up to 50% of the total iron), from the ferrous to the ferric state. A slurry of limestone is then added, as before described, except that it is limited in amount to from 60% to 70% of the theoretical requirement, whereupon the iron is completely precipitated as an insoluble phosphate, along with dicalcium phosphate up to about 50% of the $P_2O_5$ content of the solution. With this dicalcium phosphate there is precipitated as an insoluble compound any fluorine which may have escaped previous treatment.

The dicalcium phosphate containing the impurities precipitated therewith is now filtered off and can be utilized as fertilizer product. The remaining purified solution is now treated with a further addition of a slurry of limestone up to 95% of the total amount of CaO required to react with the $P_2O_5$ in the solution, with agitation. Pure dicalcium phosphate is now precipitated out of this solution, which may be employed in food products.

It will be understood that, while limestone, for economical reasons, may be preferable to hydrated lime in this step of my process, the latter may be employed to precipitate the dicalcium phosphate.

The remaining $P_2O_5$ in the solution, after separation of the dicalcium phosphate, is now precipitated as before described, with milk of lime or the addition of a soluble alkali, and this precipitate, which contains a considerable amount of tricalcium phosphate, is added to the original solution to be dissolved therein to recover its $P_2O_5$ content as dicalcium phosphate.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A process of purifying and recovering the $P_2O_5$ content of hydrochloric acid solutions of phosphate rock, which includes bringing the solution into intimate contact with a mass of silica skeleton obtained by the acid leaching of mineral silicate to free it of fluorine, and precipitating the P₂O₅ content therefrom as dicalcium phosphate by reacting with ground limestone.

2. In a process of purifying and recovering the P₂O₅ content of a hydrochloric acid solution of phosphate rock, the step of removing fluorine compounds therefrom by passing it through a bed of porous silica obtained by the acid leaching of mineral silicate.

3. In a process of purifying and recovering the P₂O₅ content of a hydrochloric acid solution of phosphate rock, the step of removing fluorine compounds therefrom by passing it through a bed of serpentine which has been leached with mineral acid to render it porous.

4. A process for the substantially complete removal of fluorine compounds from an acid calcium phosphate solution containing such compounds which comprises contacting said acid solution with an adsorptive skeletal form of silica obtained by the acid leaching of silicate minerals.

5. A process for the substantially complete removal of fluorine compounds from an acid calcium phosphate solution containing such compounds which comprises contacting said acid solution with an adsorptive skeletal form of silica obtained by the acid leaching of serpentine.

6. A process for the substantially complete removal of fluorine compounds from an acid calcium phosphate solution containing such compounds which comprises contacting said acid solution with an adsorptive skeletal form of silica obtained by the acid leaching of chrysocolla.

WARREN R. SEYFRIED.